UNITED STATES PATENT OFFICE 2,592,618

BIS(ETHYLXANTHOYLTHIOXY) - PIPERI-DYL-PHOSPHINE OXIDES AND SULFIDES

Henry Tolkmith, Midland, Mich., assignor to The Dow Chemical Company, Midland, Mich., a corporation of Delaware No Drawing. Application December 30, 1950, Serial No. 203,774

3 Claims. (Cl. 260—293.4)

This invention is directed to the bis(ethylxanthoylthioxy)-piperidyl-phosphine oxides and sulfides of the formula

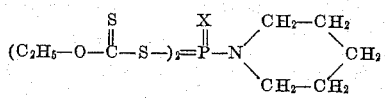

In this and succeeding formulae X represents oxygen or sulfur. These compounds are viscous oils, somewhat soluble in many organic solvents and substantially insoluble in water. They are of value as intermediates for the preparation of more complex organic derivatives and as constituents of parasiticide compositions.

The new compounds may be prepared by reacting an alkali metal ethylxanthate with a piperidyl phosphoric dichloride or piperidyl thiophosphoric dichloride of the formula:

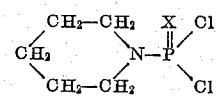

in an inert organic solvent such as benzene. Of the alkali metal xanthates found useful in the reaction, it is preferred to employ the sodium compound. In practice, good results are obtained when one molecular proportion of the piperidyl compound is reacted with two molecular proportions of sodium ethylxanthate.

In carrying out the reaction, the solvent, sodium ethyl xanthate, and piperidyl compound are mixed together and the resulting dispersion heated with stirring for a period of time at a temperature of from 40° to 80° C. In practice, it is sometimes convenient to operate at the boiling temperature of the reaction mixture and under reflux. Temperatures substantially in excess of 80° C. for any appreciable period of time are to be avoided, as the desired product has a tendency to decompose at such temperatures. Upon completion of the reaction, the reaction mixture may be filtered and the filtrate distilled under reduced pressure at temperatures gradually increasing up to 80° C. to separate low boiling constituents and to obtain as a residue the desired product.

The piperidyl phosphoric dichloride and piperidyl thiophosphoric dichloride employed as starting materials in the above-described method may be prepared by reacting phosphorus oxychloride ($POCl_3$) or phosphorus thiochloride ($PSCl_3$) with piperidine. Good results are obtained when employing two molecular proportions of piperidine with each molecular proportion of phosphorus oxychloride or phosphorus thiochloride. The reaction takes place at the temperature range of from 0° to 40° C. The reaction is somewhat exothermic, the temperature being controlled by regulation of the rate of contacting the reactants as well as by the addition or subtraction of heat, if required. Following the reaction, the crude mixture may be filtered and the filtrate fractionally distilled under reduced pressure to separate the desired product.

*Example 1.—Bis(ethylxanthoylthioxy)-piperidyl-phosphine oxide*

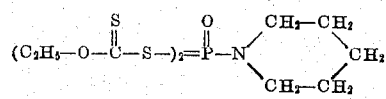

10.5 grams (0.052 mole) of piperidyl phosphoric dichloride (boiling at 257° C. at 760 millimeters pressure) and 14.25 grams (0.106 mole) of sodium ethylxanthate were dispersed in 50 milliliters of benzene and the resulting mixture heated for 2 hours at the boiling temperature and under reflux. At the end of this period the reaction mixture was filtered and the filtrate concentrated by distillation under reduced pressure at a temperature gradually increasing up to 80° C. to obtain as a residue a bis(ethylxanthoylthioxy)-piperidyl-phosphine oxide product. The latter is a viscous oil having a density of 1.136 at 18° C.

*Example 2.—Bis(ethylxanthoylthioxy)-piperidyl-phosphine sulfide*

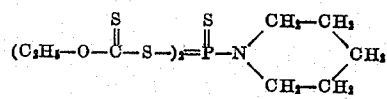

In a similar fashion sodium ethylxanthate and piperidyl thiophosphoric dichloride (boiling at 146°–149° C. at 21 millimeters pressure) were reacted together to obtain a bis(ethylxanthoylthioxy)-piperidyl-phosphine sulfide product as a viscous oil having a density of 1.135 at 18° C.

I claim:
1. A compound of the formula

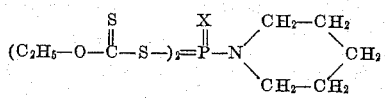

wherein X represents a member of the group consisting of oxygen and sulfur.
2. Bis(ethylxanthoylthioxy)-piperidyl - phosphine oxide.
3. Bis(ethylxanthoylthioxy)-piperidyl - phosphine sulfide.

HENRY TOLKMITH.

No references cited.